UNITED STATES PATENT OFFICE.

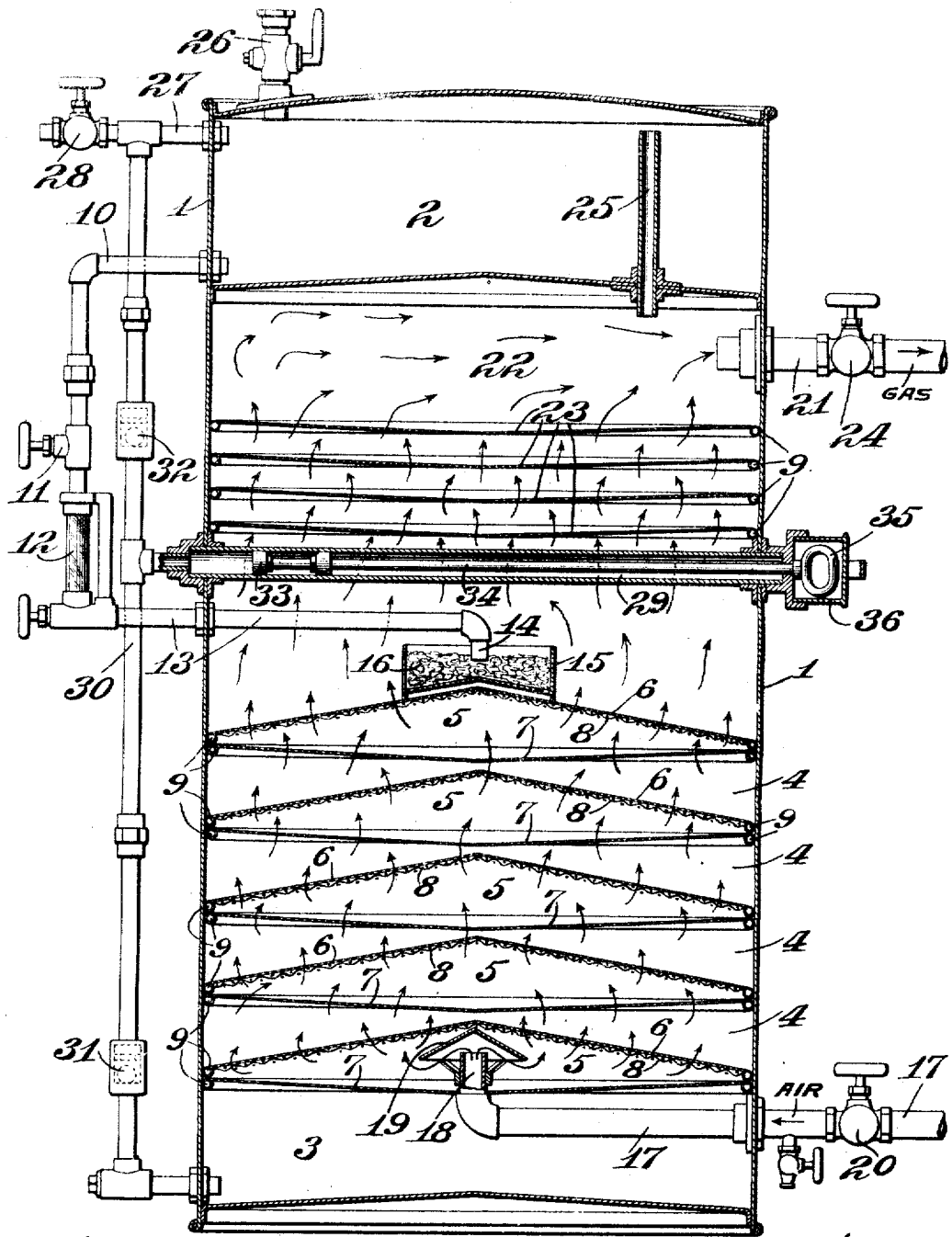

FREDERICK SCHMITT AND JOHN W. NEUMANN, OF ST. LOUIS, MISSOURI; SAID NEUMANN ASSIGNOR TO SAID SCHMITT.

GAS-MACHINE.

No. 906,940.     Specification of Letters Patent.     Patented Dec. 15, 1908.

Application filed January 10, 1907. Serial No. 351,579.

*To all whom it may concern:*

Be it known that we, FREDERICK SCHMITT and JOHN W. NEUMANN, citizens of the United States, and residents of the city of St. Louis and State of Missouri, have invented a new and useful Improvement in Gas-Machines, of which the following is a specification.

This invention relates to gas machines, and especially gas machines of the class in which a liquid hydrocarbon is volatilized and mixed with air to produce a combustible gas.

It has for its principal objects to provide for a complete volatilization of the liquid; to provide for a thorough mixture and impregnation of air with the resultant vapor from such volatilization; to provide for the absorption of moisture from the mixture of air and vapor; and to embody all these features in a compact and efficient apparatus which is simple in construction and easily operated and controlled.

The invention consists in the parts and in the arrangements and combinations of parts hereinafter described and claimed.

In the accompanying drawing which forms part of this specification, and wherein like symbols refer to like parts wherever they occur, is illustrated an apparatus embodying our invention, the same being shown in vertical section.

The apparatus comprises a tank 1 which is preferably cylindrical. This tank is divided into compartments or chambers. The upper chamber 2 constitutes a reservoir from which the volatile liquid is fed to the carbureter. At the bottom of the tank 1 is a chamber 3 which is adapted to receive any overflow or drippings from the carbureter. Above the chamber 3 is a series of carbureting or mixing chambers 4 and 5. These chambers are spaces between a plurality of screens 6 and 7. The screens 6 are conical, and the screens 7 are slightly dished or of inverted cone-shape. These screens are preferably thin sheets of woolen or other suitable cloth fabric which will absorb liquid such as is generally used in gas machines of this character, and of a mesh sufficiently open to permit the passage of air therethrough. The screens 6 may be supported by any suitable open framework, but it is preferable to use a wire screen 8 of large mesh so that the under surface of the fabric 6 is uniformly exposed to the action of the air within the apparatus. The screens 7 are simply attached to rings 9 which are secured within the tank 1. These screens 7 are made full so that they will sag slightly at the center. The rings 9 which are provided for all the screens 6 and 7 are fitted tightly in the tank and engage the same entirely around.

A pipe 10 is attached to the tank 1 and communicates with the reservoir 2 near the bottom thereof. This pipe is turned downwardly and is provided with a valve 11. Below the valve 11 the pipe 10 opens into a transparent tube or "sight-feed" 12 through which the movement of the liquid to the carbureter may be observed. A pipe 13 is connected to the sight-feed 12 and extends into the tank 1. The pipe 13 terminates centrally above the uppermost screen 6 and is provided with an L-extension 14.

The pipe 13 empties into a "seep-pan" 15. The pan 15 has a slightly conical bottom and is preferably provided with an annular series of small apertures near its circular wall through which the liquid seeps onto the screen 6. If desired, the bottom of the pan 15 may be perforated throughout, or made of wire gauze. Absorbent material 16 is placed in the seep-pan to take up the liquid as it is discharged from the pipe 13. Thus the liquid percolates through the material and seeps from the pan instead of jetting therefrom. The liquid which seeps from the pan 15 is absorbed by the uppermost screen fabric 6, and any liquid not taken up thereby, will trickle down the upper face of the conical screen towards the edge thereof, where it will seep through and drip upon the edge of the adjacent screen fabric 7 and be absorbed thereby. Should there be a further surplus of liquid the same will trickle towards the center of the sagging screen 7 and seep through and drip upon the apex portion of the next adjacent screen fabric 6, and so on to the overflow or drippings chamber 3.

An air-supply-pipe 17 extends into the tank 1 near the upper portion of the chamber 3. At its inner end it is provided with an upturned L-extension 18 which opens into the mixing chamber 5 between the lowermost screens 6 and 7. A conical deflecting cap 19 is mounted above the L-extension 18 to prevent any liquid from entering the pipe 17 and to deflect the air radially as it is discharged from the supply pipe. A valve 20 is provided in the pipe 17 to control the passage of air therethrough.

The air entering the tank will move upwardly, following the direction indicated by the arrows in the drawing, and pass out through the gas-pipe 21. The vaporization of the volatile liquid takes place on surfaces of the several screens, and the vapor being of a specific gravity heavier than air will have a tendency to hang close to the upper surfaces of the screens, and the greatest amount of vaporization will take place on the under surfaces of said screens. Thus, the vapor has a tendency to move towards the bottom of the tank. The upwardly-moving air will resist and become impregnated with the downwardly-moving vapor, and thereby a combustible mixture is supplied to a gas-chamber 22 just beneath the reservoir 2.

By passing the air through the particular construction of screens herein set forth, instead of over the surfaces as has been the usual practice, a perfect mixture of air and vapor is effected. The air being compelled to pass through the screens causes a more rapid volatilization of the liquid, and by opposing and assailing the downward movement of the vapor, a much lower grade of hydrocarbon liquid may be used in the present apparatus than can be ordinarily used in arrangements of apparatus now generally employed.

Interposed between the mixing chambers and gas storage chamber is a series of spaced drier screens 23. These screens are preferably made of a woolen fabric similar to the fabric of the screens 6 and 7, or of any other suitable material which will absorb moisture. The mixture of air and vapor is passed through these screens and it enters the chamber 22 free of moisture, and the resultant product which is supplied to the gas main is dried to such an extent before it enters the pipes that condensation in the pipes is thereby prevented. Any surplus moisture or condensation collected by said drier screens will trickle towards the center thereof and there seep through and drip downward from screen to screen into the carbureter chamber.

A suitable valve 24 is provided in the pipe 21 for controlling the outlet of gas from the chamber 22. An equalizer-pipe 25 communicates with the said chamber 22 and extends into the reservoir 2 to a point near the top. Thus the liquid in the reservoir is maintained under a pressure equal to the pressure in the other chambers. A valved filler-pipe 26 is provided at the top of the tank for the reservoir 2, and a horizontal vent-pipe 27 is provided with a valve 28.

A pump-cylinder comprising a tube 29 extends transversely through the tank 1. At one end this tube communicates with a pipe 30. This pipe 30 connects the vent pipe 27 with the lower portion of the overflow-chamber 3, and it is provided with two suitable check-valves 31 and 32 which open towards the reservoir 2. The check-valves are arranged one above and one below the connection with the pump-tube 29, and thus when the plunger 33 is reciprocated by the rod 34 any liquid which may be in the chamber 3 is pumped up into the reservoir 2. The pump-rod 34 is provided with a handle 35, and a removable casing or cover 36 is placed on the end of the tube 29 over the handle when it is not in use to prevent leakage.

By the construction and arrangement herein set forth an apparatus is produced which is compact, and simple and effective in operation. All grades of the well known volatile hydrocarbons may be used in the present apparatus and a low grade can be used with good results.

Obviously, my device admits of considerable modification within the scope of my invention, and therefore, I do not wish to be limited to the specific construction shown and described.

What I claim as my invention and desire to secure by Letters Patent is:

1. A gas machine comprising a tank, a reservoir in the upper portion thereof adapted to contain a volatile hydrocarbon liquid, a carbureter below said reservoir, said carbureter comprising a plurality of spaced absorbent screens of thin sheet fabric fitted tightly at their edges to said tank, a seep-pan above the uppermost of said screens, a feed-pipe arranged to discharge the liquid from said reservoir into said seep-pan, a supply-pipe arranged to discharge air beneath said screens, and an outlet-pipe arranged to discharge mixed air and vapor from said tank above said screens, said seep-pan containing absorbent material and having perforations in its bottom.

2. A gas machine comprising a tank, a reservoir in the upper portion thereof adapted to contain a volatile hydrocarbon liquid, a carbureter below said reservoir, said carbureter comprising a plurality of spaced absorbent screens fitted tightly in said tank, a pipe arranged to discharge the liquid from said reservoir onto the top of said screens, a sight-feed in said pipe, means for regulating the flow of liquid through said sight-feed, a pipe arranged to discharge air beneath said screens, a deflector above the discharge opening of said pipe, a plurality of spaced absorbent drier-screens above said carbureter-screens, and a pipe arranged to discharge mixed air and vapor from said tank above said drier-screens.

3. A gas machine comprising a tank, a reservoir in the upper portion thereof adapted to contain a volatile hydrocarbon liquid, a carbureter below said reservoir, said carbureter comprising a plurality of spaced absorbent screens, a seep-pan above the uppermost of said screens, a pipe arranged to discharge the liquid from said tank into said seep-pan, means for regulating the flow of liquid through said pipe, an air-pipe arranged to discharge into the tank beneath said screens, a deflector mounted over the discharge end of said air-pipe, and adapted to deflect the discharged air radially, a plurality of absorbent drier-screens above said carbureter-screens, a pipe arranged to discharge mixed air and vapor from said tank above said drier-screens, an overflow-chamber below said carbureter-screens, and a pump arranged to return the overflow-liquid from said overflow-chamber to said reservoir.

Signed at St. Louis, Missouri, this 4th day of January, 1907.

FREDERICK SCHMITT.
JOHN W. NEUMANN.

Witnesses:
G. A. PENNINGTON,
J. B. MEGOWN.